United States Patent
Walkling

[15] 3,673,163
[45] June 27, 1972

[54] PHARMACOLOGICAL PREPARATION CONTAINING AN ACRONYCINE-POLYVINYLPRROLIDONE COPRECIPITATE

[72] Inventor: W. Douglas Walkling, Indianapolis, Ind.
[73] Assignee: Eli Lilly and Company, Indianapolis, Ind.
[22] Filed: June 16, 1970
[21] Appl. No.: 46,810

[52] U.S. Cl. .............................260/279 R, 424/80, 424/257
[51] Int. Cl. .........................................................C07d 37/12
[58] Field of Search......................................260/279; 424/80

[56] References Cited

UNITED STATES PATENTS 2,718,487  9/1955  Marz.......................................260/279

Primary Examiner—Donald G. Daus
Attorney—Everet F. Smith and James L. Rowe

[57] ABSTRACT

A novel pharmaceutical preparation of acronycine comprising an acronycine-polyvinylpyrrolidone coprecipitate of increased solubility.

5 Claims, No Drawings

PHARMACOLOGICAL PREPARATION CONTAINING AN ACRONYCINE-POLYVINYLPRROLIDONE COPRECIPITATE

BACKGROUND OF THE INVENTION

Acronycine, also known as acronine, was isolated from the bark of the Australian scrub ash or scrub yellow wood, *Acronychia Baueri Schott*, (also known as *Bauerella Australiana Borzi*) by Lahey and co-workers [*Australian J. Sci. Res.* 2A, 423–b, (1949)]. A description of the physical properties of the purified material is given in ibid, 3A, 593–614. (1950). Acronycine has shown outstanding antineoplastic activity against a series of transplanted tumors in mice including B-82 leukemia, C-1498 leukemia, Ridgeway osteogenic sarcoma, X-5563 myeloma, and Shionogi carcinoma 115, as well as other tumors. The activity of acronycine as an antineoplastic agent is set forth in a publication by Svoboda et al., *Alkaloids of Acronychia Baueri Schott I, J. Pharm. Sci.*, 55, 8, (1966). The drug is presently a subject of an Investigational New Drug application (IND) before the Food and Drug Admimistration [nd is presensly undergoimg a ckinical trial in humans.

A recurring problem with the initiation of a ckinical trial of acronycine has been the inability to obt[in significant blood levdls of the drum upon or[l administration to volunteer subjects. Part of this failure is ascribable to the extreme insolubility of acronycine in water. It is an object of this invention to provide an acronycine dosage form of increased solubility.

Polyvinylpyrrolidone (PVP) has been used to increase the solubility of aromatic compounds and among these aromatic compounds have been several useful drugs. In particular, PVP complexes of drugs have been employed to increase the solubility of the drug for intravenous injection. Publications detailing the use of PVP complexes include the following:

P Molyneux and H. Frank, *J. Am. Chem. Soc.* 83, 3169 (1961),

T Higuchi et al., *J. Am. Pharm. Assoc., Sci. Ed.*, 43, 393 (1954) ), ibid, 398 (1954), M. Mayersohn et al., *J. Pharm. Sci.*, 55, 1323 (1966), A. P. Simonelli et al., *J. Pharm. Sci.*, 58, 538 (1959), and J. P. Davignon, *Bull. Parent. Drug Assoc.*, 23, 83 (1969).

No PVP complexes of a compound resembling acronycine structurally are known.

SUMMARY

This invention provides an acronycine dosage form of increased solubility comprising an acronycine-polyvinylpyrrolidone (PVP) coprecipitate in which the ratio of acronycine to PVP is in the range of 1 – 1 to 1 – 10 and the molecular weight of PVP is in the range of 10,000 to 360,000. Particularly useful coprecipitates are those in which the PVP has a molecular weight average of about 40,000, and those in which the PVP has a molecular weight of about 10,000.

The coprecipitates of this invention are prepared as follows: acronycine and PVP are dissolved separately in alcohol, the solutions and combined and the solvent evaporated, preferably in vacuo. Other solvents in which both acronycine and PVP are soluble can be used in place of ethanol.

This invention is further illustrated by the following specific examples:

EXAMPLE I

One gm. of acronycine and 5 gms. of PVP (M.W. = 40,000) were separately dissolved in ethanol, the ethanol solutions were combined and the ethanol removed by evaporation in vacuo. The resulting coprecipitate containing acronycine and PVP in a 1 – 5 ratio had a solubility of about 55.6 mcg./ml., about 15 times the solubility of acronycine.

EXAMPLE II

One gm. of acronycine and 10 gms. of PVP (M.W. = 40,000) were separately dissolved in alcohol and a coprecipitate having an acronycine-PVP ratio of 1 – 10 was prepared as in the previous example. The solubility of this coprecipitate was 115 mcg./ml., approximately 25 times the solubility of acronycine.

Coprecipitates containing 1 gm. acronycine and 5 gms. of PVP (M.W. = 10,000) and 1 gm. of acronycine and 2 gms. of PVP (M.W. = 10,000) were also prepared by following the procedure of the above examples.

In testing, the above two preparations against transplanted tumors in mice have shown twice the efficacy against transplanted tumors by both the oral and intraperitoneal route as compared with acronycine itself. Coprecipitates prepared as indicated above are administered to mammals by thoroughly admixing a given amount of the coprecipitate with any suitable solid excipient, such as starch, and then loading a quantity of said mixture into a telescoping gelatin capsule so that each capsule will provide the desired dosage of acronycine.

I claim:

1. A coprecipitate of acronycine with a polyvinylpyrrolidone having a molecular weight in the range 10,000 – 360,000, the ratio of acronycine to polyvinylpyrrolidone being in the range 1 – 1 to 1 – 10, inclusive.

2. A coprecipitate according to claim 1, said coprecipitate containing 1 part of acronycine to 5 parts of polyvinylpyrrolidone (M.W. = 40,000).

3. A coprecipitate according to claim 1, said coprecipitate containing 1 part of acronycine to 10 parts of polyvinylpyrrolidone (M.W. = 40,000).

4. A coprecipitate according to claim 1, said coprecipitate containing 1 part of acronycine to 5 parts of polyvinylpyrrolidone (M.W. = 10,000).

5. A coprecipitate according to claim 1, said coprecipitate containing 1 part of acronycine to 2 parts of polyvinylpyrrolidone (M.W. = 10,000).

* * * * *